3,121,112
N-TRIFLUOROMETHYL AMINO-SULFUR COMPOUNDS

Charles W. Tullock, Wilmington, Del., assignor to E. I. du Pont de Nemours and Company, Wilmington, Del., a corporation of Delaware
No Drawing. Filed Sept. 29, 1959, Ser. No. 843,047
6 Claims. (Cl. 260—543)

This patent relates to, and has as its principal objects provision of, a new class of fluorine compounds and a method for preparing the same.

Highly fluorinated organic compounds are becoming increasingly useful because of their unusual chemical and physical properties. Important new and diverse uses are continually being found for the highly fluorinated organic compounds, and the list of new organic fluorine compounds is growing rapidly. Thus far, however, little attention has been given to highly fluorinated nitrogen/sulfur compounds.

In accordance with the present invention, a new class of highly fluorinated compounds is now provided having the general formula $(CF_3)_2N-S_xY$, where $x$ is 1 to 3 and Y is Cl— or $(CF_3)_2N$—. This class of compounds, which embraces bis(trifluoromethyl)aminosulfenyl chloride, $(CF_3)_2NSCl$, and di[bis(trifluoromethyl)amino]sulfide, $(CF_3)_2NSN(CF_3)_2$, can be prepared by the reaction of bis(trifluoromethyl)amine, $(CF_3)_2NH$, with sulfur dichloride and by the reaction of N-chlorobis(trifluoromethyl)amine, $(CF_3)_2NCl$, with sulfur.

The course of the reactions by which the products of this invention are formed may proceed by one or more of the following equations:

(1) $(CF_3)_2NH + SCl_2 + 2KF \rightarrow$
$(CF_3)_2NSCl + KCl + KHF_2$
(2) $2(CF_3)_2NH + SCl_2 + 4KF \rightarrow$
$(CF_3)_2NSN(CF_3)_2 + 2KCl + 2KHF_2$
(3) $2SCl_2 \rightarrow S_2Cl_2 + Cl_2$
(4) $2S_2Cl_2 \rightarrow S_2Cl_4 + S_2$
(5) $(CF_3)_2NH + S_2Cl_2 + 2KF \rightarrow$
$(CF_3)_2NS_2Cl + KCl + KHF_2$
(6) $2(CF_3)_2NH + S_2Cl_2 + 4KF \rightarrow$
$(CF_3)_2NS_2N(CF_3)_2 + 2KCl + 2KHF_2$
(7) $(CF_3)_2NH + Cl_2 + 2KF \rightarrow$
$(CF_3)_2NCl + KCl + KHF_2$
(8) $(CF_3)_2NCl + S_x \rightarrow (CF_3)_2N(S)_xCl$
(9) $2(CF_3)_2NCl + S_{x+2} \rightarrow (CF_3)_2NS_xN(CF_3)_2 + S_2Cl_2$ It appears probable that reaction of $SCl_2$ with $(CF_3)_2NH$ to form $(CF_3)_2NSCl$ and $(CF_3)_2NSN(CF_3)_2$ occurs through the intermediate formation of $(CF_3)_2NCl$. It is known that sulfur dichloride can decompose at the temperature of the process of this invention to give chlorine, sulfur and lower-valent sulfur chlorides as shown in Equations 3 and 4. The chlorine can then react with bis(trifluoromethyl)amine as shown in Equation 7 to give intermediate N-chlorobis(trifluoromethyl)amine which in turn can react with sulfur as shown in Equations 8 and 9.

In one procedure for preparing the products of this invention, bis(trifluoromethyl)amine and sulfur dichloride are heated in the presence of the hydrogen fluoride acceptor potassium fluoride in a closed reactor at 100–350° C. under autogenous pressure with agitation for a period of time varying inversely with the temperature but usually ranging from one to five hours. After cooling to room temperature, the volatile products are distilled under reduced pressure from the reactor into a compressed gas cylinder cooled to about −190° C. The volatile products collected in the receiver, after warming to room temperature, consist of a gaseous and a liquid phase under autogenous pressure. The liquid phase consists of a mixture of the new products, bis(trifluoromethyl)aminosulfenyl chloride and di[bis(trifluoromethyl)amino]sulfide. These products may be separated by fractional distillation.

In another procedure, N-chlorobis(trifluoromethyl)amine is heated with sulfur at 100–350° C. under autogenous pressure for one to five hours or more. The reactor is then cooled to about 25° C. and volatile products, if any, are vented or collected. The main portion of the product remains as a liquid in the reactor at normal atmospheric temperature and pressure. The product may be decanted from any remaining unreacted sulfur in the reactor and fractionally distilled, thus giving pure fractions of $(CF_3)_2NSCl$ and $(CF_3)_2NSN(CF_3)_2$ with other fractions consisting of mixtures of $(CF_3)_2NS_2Cl$ and $(CF_3)_2NS_2N(CF_3)_2$. These mixtures may, in turn, be separated as desired, e.g., by distillation.

Bis(trifluoromethyl)amine, one of the starting materials used for the process of this invention, can be prepared by the reaction of hydrogen fluoride with perfluoro-2-azapropene (Barr and Haszeldine, J. Chem. Soc. 1955, 2532). N-chlorobis(trifluoromethyl)amine, another raw product which can be used in carrying out this invention, can be prepared by the reaction of chlorine with di[bis(trifluoromethyl)amino]mercury, $(CF_3)_2NHgN(CF_3)_2$ [Young et al., J. Am. Chem. Soc. 80, 3604 (1958)].

Bis(trifluoromethyl)aminosulfenyl chloride is a yellow liquid of high density and strong acrid odor. Di[bis(trifluoromethyl)amino]sulfide is a pale yellow or colorless liquid of high density with a mild acrid odor. These products are stable on storage out of contact with air. They are thermally stable out of contact with air and can be heated up to about 300° C. for short periods of time without appreciable decomposition. Both the bis(trifluoromethyl)aminosulfenyl chlorides and the di[bis(trifluoromethyl)amino]sulfides are insoluble in water, but are slowly hydrolytically decomposed at room temperature by water. They are readily hydrolytically decomposed by aqueous alkalies at room temperature.

The following examples are given to more fully illustrate the invention.

Example 1

A mixture of 84 g. of sulfur and 64 g. of N-chlorobis(trifluoromethyl)amine, $(CF_3)_2NCl$, was heated with agitation in the absence of air under autogenous pressure in a 500-ml. bomb lined with a chemically resistant alloy of nickel, iron and molybdenum ("Hastelloy" C) at 150° C. for 1 hour and at 225° C. for 1 hour. The reactor was allowed to cool to room temperature and volatile products, amounting to less than 1 g. were vented. This volatile product appeared to be chiefly $CF_3N=CF_2$.

The liquid product remaining in the reactor was decanted from solid unreacted sulfur and distilled through a spinning band column to give the following fractions:

| Fraction No. | Boiling Point, ° C. | Amount (g.) |
|---|---|---|
| 1 | 49.5–51 | 15.8 |
| 2 | 76–77 | 11.3 |
| 3 | 99–101 | 6.9 |

Fraction 1 was a yellow compound which reacted with aqueous sodium hydroxide solution at 25° C. Mass spectrometric analysis showed that it was pure $(CF_3)_2NSCl$. The major absorption bands in the infrared (gas phase) in microns were 7.55, 7.95, 8.10, and 14.10. The elemental analysis was as follows:

*Analysis.*—Calcd. for $C_2ClF_6NS$: Cl, 16.17; F, 51.93; S, 14.58. Found: Cl, 15.39; F, 51.64; S, 13.90.

Fraction 2 was almost colorless. It reacted with aqueous sodium hydroxide solution at 25° C. Mass spectrometric analysis showed that it was $(CF_3)_2NSN(CF_3)_2$. The major absorption bands in the infrared (gas phase) analysis in microns were 7.50, 7.60, 7.85, 8.10, 8.25, 10.25, and 14.10. The elemental analysis was as follows:

*Analysis.*—Calcd. for $C_4F_{12}N_2S$: F, 67.85; S, 9.52. Found: F, 67.79; S, 9.80.

Fraction 3 was a mixture of $(CF_3)_2NS_2N(CF_3)_2$ (mass spectrometric analysis) and other compounds not positively identified but believed to contain $(CF_3)_2NS_2Cl$. Gas chromatography showed two compounds present in about equal amounts.

The $(CF_3)_2NSCl$ (fraction 1) was formed in 21% conversion, and the $(CF_3)_2NSN(CF_3)_2$ (fraction 2) was formed in a 20% conversion, each based on $(CF_3)_2NCl$. These values are based on redistilled material.

*Example II*

A mixture of 30 g. of sulfur and 26 g. of N-chlorobis(trifluoromethyl)amine was heated in the apparatus described in Example I under autogenous pressure at 150° C. for 1 hour and at 225° C. for 2 hours. One gram of the product was volatile at 25° C. and infrared analysis showed that it contained, on a molar basis, 40% $CF_3N=CF_2$, 40% $(CF_3)_2NH$, and 20% $SOF_2$.

The liquid product remaining in the bomb after removal of the above volatile portion was distilled through a small modified Vigreux column to give the following fractions:

| Fraction No. | B.P., °C. | Amount (g.) | Remarks |
| --- | --- | --- | --- |
| 1 | 17–33 | 1 | Yellow liquid. |
| 2 | 33–44 | 2 | Do. |
| 3 | 44–55 | 6 | Do. |
| 4 | 61–70 | 3 | Pale yellow liquid. |
| 5 | 70–72.5 | 2 | Very pale yellow liquid. |
| 6 | 75–99 | 2 | Yellow liquid. |
| 7 | 99–101 | 2.5 | Pale yellow liquid. |
| 8 | 134–136 | 4 | Yellow liquid; this was $S_2Cl_2$. |

Nuclear magnetic resonance (fluorine) showed that fractions 2 and 3 were chiefly the same compound; mass spectrometric analysis showed that fraction 3 was bis(trifluoromethyl)aminosulfenyl chloride containing small amounts of di[bis(trifluoromethyl)amino]sulfide $$[(CF_3)_2N—S—N(CF_3)_2]$$

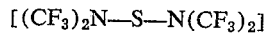

Nuclear magnetic resonance (fluorine) indicated that fractions 4 and 5 were chiefly the same compound; mass spectrometric analysis showed that fraction 5 was mostly $(CF_3)_2NSN(CF_3)_2$ containing, on a molar basis, about 5% $(CF_3)_2NSCl$ and 5% $(CF_3)_2NS_2N(CF_3)_2$.

Mass spectrometric analysis indicated that fraction 7 was chiefly a mixture of $(CF_3)_2N—S—N(CF_3)_2$ and $(CF_3)_2NS_2N(CF_3)_2$, and containing in addition 4–12% $(CF_3)_2NS_2Cl$ and very small amounts of $(CF_3)_2NS_3Cl$, $(CF_3)_2NS_3N(CF_3)_2$ and $(CF_3)_2NS_4N(CF_3)_2$. Infrared analysis of these compounds was consistent with the proposed structures.

*Example III*

A mixture of 25 g. of sulfur and 14 g. of N-chlorobis(trifluoromethyl)amine was heated in the apparatus described in Example I under autogenous pressure at 100° C. for 1 hour, at 200° C. for 1 hour, at 275° C. for 1 hour, and at 325° C. for 1 hour. The reactor was allowed to cool to room temperature and was then connected by means of copper tubing to an evacuated 300 cc. stainless steel cylinder cooled in liquid nitrogen. The volatile products were collected in the cooled cylinder. After the transfer of volatile products had been completed, the receiver was closed and warmed to room temperature. The cylinder contained 9 g. of gas and 6 g. of a yellow liquid. The non-volatile liquids remaining in the "Hastelloy" C bomb had a strong odor of sulfur monochloride $(S_2Cl_2)$.

Infrared analysis showed that the 6 g. of liquid in the cylinder was chiefly bis(trifluoromethyl)aminosulfenyl chloride, $(CF_3)_2NSCl$.

*Example IV*

A mixture of 50 g. of sulfur dichloride $(SCl_2)$, 40 g. of bis(trifluoromethyl)amine, $(CF_3)_2NH$, and 100 g. of anhydrous potassium fluoride was heated as described in Example I at 150° C. for 1 hour and 275° C. for 4 hours. The reactor was then cooled to room temperature, and the volatile products were transferred as in Example III to a liquid nitrogen-cooled evacuated cylinder. The volatile products which collected in the cylinder, after warming to room temperature, consisted of 18 g. of a gas and 13 g. of a yellow liquid. The residue remaining in the reactor was a solid wet with liquid. It had a strong odor of sulfur monochloride $(S_2Cl_2)$ and weighed 148 g.

Infrared analysis showed that the yellow liquid in the cylinder was chiefly a mixture of $(CF_3)_2NSCl$ and $(CF_3)_2NSN(CF_3)_2$ in about equal amounts, together with a small amount of $CF_3N=CFN(CF_3)_2$ (the dimer of $CF_3N=CF_2$) and a small amount of an unidentified product.

Many variations of the above processes will be apparent to those skilled in the art. For example, a mixture of bis(trifluoromethyl)amine and sulfur dichloride can be passed at subatmospheric, atmospheric or superatmospheric pressure and elevated temperature through a tubular reactor which may be packed with a hydrogen chloride acceptor such as potassium fluoride. When the reaction is carried out in such a tubular reactor by a continuous or semi-continuous process, the temperature can be considerably higher (i.e. in the range of 300–500° C.) and the contact time can be much shorter (i.e., 1–10 minutes) than for the batch process described above. Similarly, N-chlorobis(trifluoromethyl)amine can be reacted with sulfur in a bomb-type reactor as in Examples I–III or it can be passed through or over sulfur, and reacted therewith, at 100–350° C. or even higher in an autoclave or in a tubular reactor at subatmospheric, atmospheric or superatmospheric pressure on a batch, semi-continuous or continuous basis.

Unreacted raw materials or by-product N-chlorobis(trifluoromethyl)amine may be reused in the main reaction.

The polyfluorinated-alkyl-aminosulfenyl chlorides and polyfluorinated-alkyl-aminosulfides made available by this invention are liquids and may be used as solvents for polyfluorinated polymers. Thus, both bis(trifluoromethyl)aminosulfenyl chloride and di[bis(trifluoromethyl)amino]sulfide readily dissolve low molecular weight polytetrafluoroethylene (M.P. 83–150° C.) to give solutions of 5–10% polymer concentration by weight. The solutions so obtained can be applied to fibrous materials such as paper, fabrics, wood, etc., to impart fire-retardant and water-repellent properties.

Since obvious modifications and equivalents in the invention will be evident to those skilled in the chemical arts, I propose to be bound solely by the appended claims.

The embodiments of the invention in which an exclusive property or privilege is claimed are defined as follow:

1. A compound of the formula $(CF_3)_2N—S_xY$, wherein $x$ is an integer from 1 to 3 and Y is selected from the group consisting of Cl— and $(CF_3)_2N—$.
2. $(CF_3)_2NSCl$.
3. $(CF_3)_2NSN(CF_3)_2$.
4. $(CF_3)_2NS_2N(CF_3)_2$.

5. The process which comprises reacting, at a temperature of about 100–350° C., N-chlorobis(trifluoromethyl)-amine with sulfur.

6. The process which comprises reacting, at a temperature of about 100–350° C., bis(trifluoromethyl)amine with sulfur dichloride in the presence of potassium fluoride.

References Cited in the file of this patent

UNITED STATES PATENTS

| | | |
|---|---|---|
| 2,209,976 | James | Aug. 6, 1940 |
| 2,218,447 | Badertscher et al. | Oct. 15, 1940 |
| 3,025,324 | Stevens | Mar. 13, 1962 |
| 3,052,723 | Tullock | Sept. 4, 1962 |

FOREIGN PATENTS

| | | |
|---|---|---|
| 517,995 | Germany | Feb. 13, 1931 |
| 519,449 | Germany | Feb. 27, 1931 |

OTHER REFERENCES

Lengfeld at al.: Berichte der deut. Chem. Ges., vol. 28 (1895), pages 2742–3.